(No Model.)
F. W. POOL.
PROPELLER SHAFT AND MECHANISM FOR DRIVING THE SAME.
No. 434,803.  Patented Aug. 19, 1890.
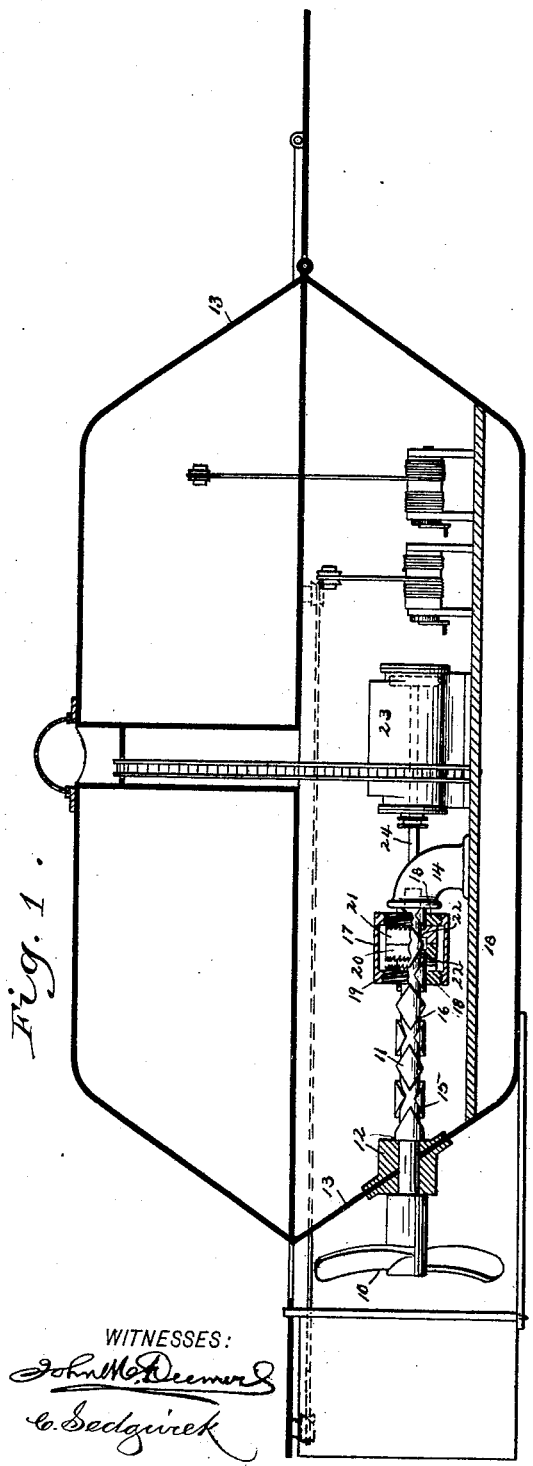
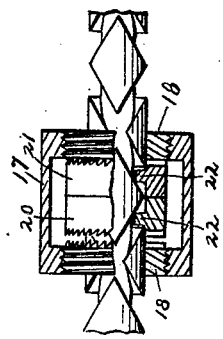
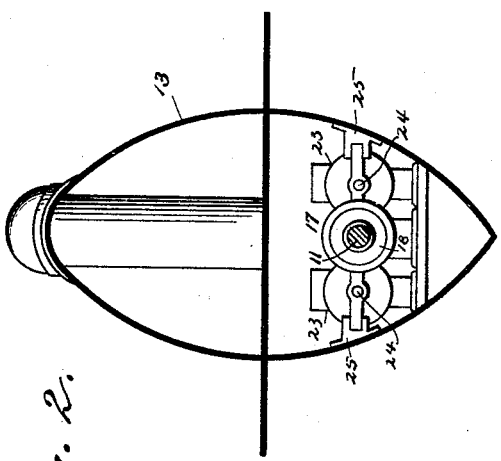
WITNESSES:
INVENTOR:
F. W. Pool
BY
Munn & Co.
ATTORNEYS

UNITED STATES PATENT OFFICE.

FRANCIS WRIGHT POOL, OF ST. PAUL, MINNESOTA.

PROPELLER-SHAFT AND MECHANISM FOR DRIVING THE SAME.

SPECIFICATION forming part of Letters Patent No. 434,803, dated August 19, 1890.

Application filed November 30, 1889. Serial No. 332,096. (No model.)

*To all whom it may concern:*

Be it known that I, FRANCIS WRIGHT POOL, of St. Paul, in the county of Ramsey and State of Minnesota, have invented a new and useful Improvement in Propeller-Shafts and Mechanism for Driving the Same, of which the following is a full, clear, and exact description.

My invention relates to an improvement in propeller-shafts and means for driving the same, and has for its object to provide for the rapid revolution of the shaft with a minimum degree of friction and through the medium of light and simple machinery; and the invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 illustrates a central section through a vessel having the propeller-shaft applied thereto. Fig. 2 is a transverse section through the vessel and shaft, and Fig. 3 is an enlarged detail view of the driving mechanism.

I have illustrated the propeller-shaft applied to the aerial vessel forming the subject-matter of the application for Letters Patent filed by myself July 23, 1888, Serial No. 280,727, as I especially design the shaft for use in connection with such a vessel; but I desire it to be understood that I do not confine myself to the application of the shaft illustrated, as the said shaft may be employed with equally-good results in connection with marine or with submarine vessels.

The propeller 10 is attached to one end of a horizontal shaft 11, which shaft is provided with a collar 12, located adjacent to the stern of the vessel 13, whereby the thrust of the shaft in that direction is limited, and the forward end of said shaft 11 is journaled in a standard 14, secured to the bottom of the lower chamber of the vessel, as best illustrated in Fig. 1. The standard 14 is preferably curved in the direction of the stern, in order that greater strength may be obtained and a better support effected for the inner end of the shaft. The shaft 11 is provided with a series of spirally-arranged grooves 15 and 16, which grooves extend from end to end of the shaft in opposite directions, crossing each other, as best shown in Fig. 1. Upon the shaft 11 a sleeve 17 is adapted to reciprocate, in the ends of which sleeve heads 18 are screwed or otherwise secured, provided with a series of teeth 19 upon their inner or contiguous faces. Between the toothed heads 18 two rings 20 and 21 are loosely held, the approaching faces of which rings are smooth and the outer edges contiguous to the heads 18 toothed, the teeth of the rings being adapted to mesh with the teeth of the heads and constitute a clutch. Each ring 20 and 21 is provided with an interior spiral lug or rib 22, the lug or rib of one ring being purposed to enter and travel in the shaft-groove 15 and the lug or rib of the other ring in the shaft-groove 16. The sleeve 17 is reciprocated from, preferably, two cylinders 23, located at each side of the shaft, the pistons 24 of which cylinders are connected to the opposite sides of the sleeve 17 in any approved manner, as best illustrated in Fig. 2. The said pistons are guided in their movements by channels or ways 25, formed upon the inner sides of the vessel. It will thus be observed that as the sleeve 17 is carried in the direction of the stern the rib of the ring 21, which communicates with the groove 16, will mesh with the forward end of the sleeve and the shaft be turned in one direction. Upon the back-stroke of the cylinder the opposite ring will engage with the opposite head, causing the rib upon the ring 20 to engage with the groove 15, whereby the shaft will continue to revolve in the same direction.

I desire it to be understood that I do not confine myself to steam as the motive power.

Having thus described my invention, I claim as new and desire to secure by Letters Patent—

1. The combination, with a shaft having spirally-arranged grooves produced upon the outer surface thereof, extending from end to end in opposite directions, and a propeller attached to the outer end of said shaft, of a sleeve mounted upon the shaft, having fixed heads and teeth upon the inner face of the heads, loose rings within the sleeve, having teeth upon their outer edge, lugs produced upon the inner surface of the rings, engaging the grooves of the shaft, cylinders located adjacent to the sleeve, and piston-rods reciprocating in said cylinders and attached to the outer surface of said sleeve, substantially as and for the purpose specified.

2. The combination, with a vessel, a shaft horizontally projected through the stern thereof, provided with spirally-arranged circumferential grooves extending in opposite directions from end to end, and a propeller secured to the outer end of the shaft, of a sleeve mounted upon said shaft, having fixed heads, teeth integral with the inner faces of the heads, two loose rings within the sleeve, having teeth upon the edges opposed to the heads, projections upon the inner surface of the rings, engaging with the grooves of the shaft, and means, substantially as shown and described, for reciprocating the said sleeve and rings upon the said shaft, as and for the purpose specified.

FRANCIS WRIGHT POOL.

Witnesses:
GEORGE BEDDIE,
THOS. N. YOUNG.